United States Patent
Jiang et al.

(10) Patent No.: US 10,549,853 B2
(45) Date of Patent: Feb. 4, 2020

(54) APPARATUS, SYSTEM, AND METHOD FOR DETERMINING AN OBJECT'S LOCATION IN IMAGE VIDEO DATA

(71) Applicant: The Boeing Company, Chicago, IL (US)

(72) Inventors: Qin Jiang, Oak Park, CA (US); Yuri Owechko, Newbury Park, CA (US); Kyungnam Kim, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 15/607,094

(22) Filed: May 26, 2017

(65) Prior Publication Data

US 2018/0342048 A1    Nov. 29, 2018

(51) Int. Cl.
    *B64C 39/02*    (2006.01)
    *G06T 11/60*    (2006.01)
    *G05D 1/00*     (2006.01)

(52) U.S. Cl.
    CPC ......... *B64C 39/024* (2013.01); *G05D 1/0038* (2013.01); *G06T 11/60* (2013.01); *B64C 2201/123* (2013.01); *G06T 2207/10016* (2013.01)

(58) Field of Classification Search
    CPC .. B60R 1/00; B60R 11/04; B60R 1/04; B60R 2001/1215
    USPC ........ 382/103, 104, 107, 108, 109; 340/933, 340/935, 937, 939
    See application file for complete search history.

(56) References Cited

U.S. PATENT DOCUMENTS

| | | | |
|---|---|---|---|
| 5,526,446 A | 6/1996 | Adelson et al. | |
| 5,892,850 A | 4/1999 | Tsuruoka | |
| 6,411,867 B1* | 6/2002 | Sakiyama | B60Q 9/005 340/901 |
| 6,567,726 B2* | 5/2003 | Sakiyama | B60Q 9/005 340/901 |
| 6,731,436 B2* | 5/2004 | Ishii | G02B 27/01 348/115 |
| 6,801,672 B1 | 10/2004 | Thomas | |
| 6,805,472 B2* | 10/2004 | Fukawa | B60Q 1/12 362/464 |
| 7,039,521 B2* | 5/2006 | Hortner | G01C 21/3647 701/436 |
| 7,068,328 B1 | 6/2006 | Mino | |
| 7,151,858 B2 | 12/2006 | Kyong | |
| 7,156,542 B2* | 1/2007 | Miller | B60Q 1/085 362/466 |

(Continued)

OTHER PUBLICATIONS

Comaniciu et al., Mean Shift Analysis and Applications, Department of Electrical and Computer Engineering, Rutgers University, pp. 1-8, accessed from http://comaniciu.net/Papers/MsAnalysis.pdf on Nov. 7, 2016.

*Primary Examiner* — Yosef Kassa
(74) *Attorney, Agent, or Firm* — Kunzler Bean & Adamson

(57) ABSTRACT

Described herein is a method of displaying an object that includes detecting a first location of the object on a first image frame of image data. The method also includes determining a second location of the object on a second image frame of the image data on which the object is not detectable due to an obstruction. The method includes displaying a representation of the object on the second image frame.

25 Claims, 6 Drawing Sheets

(56) References Cited

U.S. PATENT DOCUMENTS

| | | | | |
|---|---|---|---|---|
| 7,233,233 B2* | 6/2007 | Taniguchi | | G06K 9/00362 340/435 |
| 7,298,247 B2* | 11/2007 | Shimizu | | B60Q 9/005 340/435 |
| 7,386,394 B2* | 6/2008 | Shulman | | G01C 11/00 340/995.22 |
| 7,432,800 B2* | 10/2008 | Harter, Jr. | | B60Q 9/008 340/435 |
| 7,433,496 B2* | 10/2008 | Ishii | | G06T 5/009 348/115 |
| 7,460,130 B2 | 12/2008 | Salganicoff | | |
| 7,466,339 B2* | 12/2008 | Usami | | B60R 1/00 280/735 |
| 7,583,186 B2* | 9/2009 | Kuhls | | G07C 5/085 340/439 |
| 7,592,928 B2* | 9/2009 | Chinomi | | B60R 1/00 340/436 |
| 7,970,178 B2 | 6/2011 | Song | | |
| 8,023,760 B1 | 9/2011 | Buck et al. | | |
| 8,149,245 B1 | 4/2012 | Buck et al. | | |
| 8,175,331 B2* | 5/2012 | Nagaoka | | B60W 40/04 382/103 |
| 8,417,053 B2 | 4/2013 | Chen | | |
| 8,547,249 B2* | 10/2013 | David | | G08G 1/166 340/435 |
| 8,581,982 B1* | 11/2013 | Haley | | H04N 7/18 348/148 |
| 9,177,363 B1 | 11/2015 | Huang | | |
| 9,286,941 B2 | 3/2016 | Sandrew et al. | | |
| 9,350,905 B2 | 5/2016 | Hirooka et al. | | |
| 9,508,134 B2 | 11/2016 | Jiang et al. | | |
| 9,547,890 B2 | 1/2017 | Komiya | | |
| 9,710,917 B2 | 7/2017 | Freeman et al. | | |
| 9,842,404 B2 | 12/2017 | Freeman et al. | | |
| 10,274,423 B2 | 4/2019 | Suzuki et al. | | |
| 2003/0099405 A1 | 4/2003 | Avinash et al. | | |
| 2003/0210807 A1 | 11/2003 | Sato et al. | | |
| 2004/0008904 A1 | 1/2004 | Lin et al. | | |
| 2005/0181399 A1 | 8/2005 | Okimoto et al. | | |
| 2005/0197567 A1 | 9/2005 | Qian et al. | | |
| 2005/0265584 A1 | 12/2005 | Dobson | | |
| 2005/0286764 A1 | 12/2005 | Mittal et al. | | |
| 2006/0072014 A1 | 4/2006 | Geng et al. | | |
| 2008/0298642 A1 | 12/2008 | Meenen | | |
| 2009/0226087 A1 | 9/2009 | Aragaki et al. | | |
| 2010/0226590 A1 | 9/2010 | Yoo et al. | | |
| 2011/0012910 A1 | 1/2011 | Wei et al. | | |
| 2012/0257164 A1 | 10/2012 | Zee et al. | | |
| 2013/0235201 A1 | 9/2013 | Kiyohara et al. | | |
| 2014/0111541 A1 | 4/2014 | Tolkowsky et al. | | |
| 2014/0193032 A1 | 7/2014 | Zhang et al. | | |
| 2014/0340502 A1 | 11/2014 | Freeman et al. | | |
| 2015/0016690 A1 | 1/2015 | Freeman et al. | | |
| 2015/0332512 A1 | 11/2015 | Siddiqui et al. | | |
| 2018/0068418 A1 | 3/2018 | Jiang et al. | | |
| 2018/0096595 A1 | 4/2018 | Janzen et al. | | |
| 2018/0293457 A1 | 10/2018 | Li | | |
| 2018/0365805 A1 | 12/2018 | Owechko et al. | | |

* cited by examiner

APPARATUS, SYSTEM, AND METHOD FOR DETERMINING AN OBJECT'S LOCATION IN IMAGE VIDEO DATA

FIELD

This disclosure relates generally to image sensing, and more particularly to determining an object's location in image video data.

BACKGROUND

Some image sensors are used to obtain image sequence data by perceiving objects in day and/or night settings. The clarity of the image sequence data may be affected by environmental factors such as fog, haze, sand-brownouts, smoke, rain, snow, steam, and so forth. Unclear image sequence data may be difficult to use.

SUMMARY

The subject matter of the present application has been developed in response to the present state of the art, and in particular, in response to shortcomings of conventional image processing techniques. For example, conventional image processing techniques do not provide sufficient image clarity under certain conditions, such as in degraded visibility environments where visibility is degraded due to fog, haze, sand-brownouts, smoke, rain, snow, steam, and so forth.

Accordingly, the subject matter of the present application has been developed to provide examples of an image enhancing apparatus, system, and method that overcome at least some of the above-discussed shortcomings of prior art techniques. More particularly, in some embodiments, described herein are apparatuses, systems, and methods for determining an object's location in image video data.

A method of displaying an object identified from image data captured from a mobile vehicle includes detecting a first location of the object on a first image frame of image data. The method also includes determining a second location of the object on a second image frame of the image data on which the object is not detectable due to an obstruction. The method includes displaying a representation of the object on the second image frame. The preceding subject matter of this paragraph characterizes example 1 of the present disclosure.

The image data includes infrared image data. The preceding subject matter of this paragraph characterizes example 2 of the present disclosure, wherein example 2 also includes the subject matter according to example 1, above.

The first location of the object is detected based on intensity values corresponding to the infrared image data. The preceding subject matter of this paragraph characterizes example 3 of the present disclosure, wherein example 3 also includes the subject matter according to any one of examples 1 or 2, above.

A method includes determining whether the object is stationary or moving. The preceding subject matter of this paragraph characterizes example 4 of the present disclosure, wherein example 4 also includes the subject matter according to any one of examples 1, 2, or 3, above.

A method includes, in response to the object determined to be stationary, determining the second location of the object on the second image frame based on the first location of the object and a change in position of a vehicle used to capture the image data. The preceding subject matter of this paragraph characterizes example 5 of the present disclosure, wherein example 5 also includes the subject matter according to any one of examples 1, 2, 3, or 4, above.

A method includes, in response to the object determined to be moving, determining the second location of the object on the second image frame based on the first location of the object, a predicted location of the object, and a change in position of a vehicle used to capture the image data. The preceding subject matter of this paragraph characterizes example 6 of the present disclosure, wherein example 6 also includes the subject matter according to any one of examples 1, 2, 3, 4, or 5, above.

A method includes synchronizing the image data with navigation data of a vehicle. The preceding subject matter of this paragraph characterizes example 7 of the present disclosure, wherein example 7 also includes the subject matter according to any one of examples 1, 2, 3, 4, 5, or 6, above.

Detecting a first location of the object includes detecting a first location of an object including a landing area on a first image frame of image data. The preceding subject matter of this paragraph characterizes example 8 of the present disclosure, wherein example 8 also includes the subject matter according to any one of examples 1, 2, 3, 4, 5, 6, or 7, above.

A method includes determining whether the object is stationary or moving, and in response to a determination that the object is stationary, determining the second location of the object on the second image frame in which the object is not detectable due to an obstruction, based on the first location of the object and a change in position of the mobile vehicle. The preceding subject matter of this paragraph characterizes example 9 of the present disclosure, wherein example 9 also includes the subject matter according to any one of examples 1, 2, 3, 4, 5, 6, 7, or 8, above.

Displaying the representation of the object on the second image frame includes displaying, on a display device associated with the mobile vehicle, a representation of the object comprising a landing area that is overlaid on the second image frame where the object is expected to be, such that the object that is obscured in the second image frame is displayed as a representation of the object to an operator of the mobile vehicle. The preceding subject matter of this paragraph characterizes example 10 of the present disclosure, wherein example 10 also includes the subject matter according to any one of examples 1, 2, 3, 4, 5, 6, 7, 8, or 9, above.

A mobile vehicle includes a sensor configured to detect an image and to produce image data associated with the image. The mobile vehicle also includes a processor operatively coupled to the sensor and configured to receive the image data. The mobile vehicle includes a memory that stores code executable by the processor to: detect a first location of an object on a first image frame of the image data; predict a second location of the object on a second image frame of the image data; and display a representation of the object on the second image frame. The preceding subject matter of this paragraph characterizes example 11 of the present disclosure.

The sensor includes an infrared image sensor. The preceding subject matter of this paragraph characterizes example 12 of the present disclosure, wherein example 12 also includes the subject matter according to example 11, above.

The mobile vehicle includes a display device operatively coupled to the processor and configured to display the representation of the object on the second image frame. The preceding subject matter of this paragraph characterizes example 13 of the present disclosure, wherein example 13 also includes the subject matter according to any one of examples 11 or 12, above.

A mobile vehicle includes a navigation unit that produces navigation data for the mobile vehicle. The preceding subject matter of this paragraph characterizes example 14 of the present disclosure, wherein example 14 also includes the subject matter according to any one of examples 11, 12, or 13, above.

A mobile vehicle in which the code is executable by the processor to synchronize frames of the image data with the navigation data. The preceding subject matter of this paragraph characterizes example 15 of the present disclosure, wherein example 15 also includes the subject matter according to any one of examples 11, 12, 13, or 14, above.

A mobile vehicle in which the code is executable by the processor to determine whether the object is stationary or moving. The preceding subject matter of this paragraph characterizes example 16 of the present disclosure, wherein example 16 also includes the subject matter according to any one of examples 11, 12, 13, 14, or 15, above.

A mobile vehicle in which the code is executable by the processor to, in response to the object determined to be stationary: determine a first position of the mobile vehicle corresponding to the first image frame; determine a second position of the mobile vehicle corresponding to the second image frame; and predict the second location of the object based on the first location of the object, the first position, and the second position of the mobile vehicle. The preceding subject matter of this paragraph characterizes example 17 of the present disclosure, wherein example 17 also includes the subject matter according to any one of examples 11, 12, 13, 14, 15, or 16, above.

A mobile vehicle in which the code is executable by the processor to, in response to the object determined to be moving: determine a first position of the mobile vehicle corresponding to the first image frame; determine a second position of the mobile vehicle corresponding to the second image frame; generate a motion model for the object based on the first location of the object and another location of the object detected before the first image frame; and predict the second location of the object based on the motion model for the object, the first position of the object. The preceding subject matter of this paragraph characterizes example 18 of the present disclosure, wherein example 18 also includes the subject matter according to any one of examples 11, 12, 13, 14, 15, 16, or 17, above.

The memory that stores code includes an object detection module executable by the processor to detect a first location of the object including a landing area on a first image frame of image data, and a prediction module executable by the processor to predict a second location of the object on a second image frame in which the object is not detectable due to an obstruction, based on the first location of the object and a change in position of the mobile vehicle. The preceding subject matter of this paragraph characterizes example 19 of the present disclosure, wherein example 19 also includes the subject matter according to any one of examples 11, 12, 13, 14, 15, 16, 17, or 18, above.

A mobile vehicle includes a display device associated with the mobile vehicle, for displaying the representation of the object on the second image frame that is overlaid on the second image frame where the object is expected to be, such that the object including a landing area that is obscured in the second image frame is displayed as a representation of the object to an operator of the mobile vehicle. The preceding subject matter of this paragraph characterizes example 20 of the present disclosure, wherein example 20 also includes the subject matter according to any one of examples 11, 12, 13, 14, 15, 16, 17, 18, or 19, above.

An apparatus includes an object detection module that detects a first location of an object on a first image frame of image data based on intensity values corresponding to the first image frame. The apparatus also includes a prediction module that determines a second location of the object on a second image frame of the image data on which the object is not detectable due to an obstruction. The apparatus includes a display module that displays a representation of the object on the second image frame. At least one of the object detection module, the prediction module, and the display module comprises one or more of hardware and executable code, the executable code stored on one or more non-transitory computer readable storage media. The preceding subject matter of this paragraph characterizes example 21 of the present disclosure.

An apparatus includes a linear motion module that generates a linear motion model in response to the object moving and provides information corresponding to the linear motion model to the prediction module to facilitate determining the second location of the object. The preceding subject matter of this paragraph characterizes example 22 of the present disclosure, wherein example 22 also includes the subject matter according to any one of example 21, above.

An apparatus includes a navigation module that generates navigation data for a vehicle used to capture the image data. The preceding subject matter of this paragraph characterizes example 23 of the present disclosure, wherein example 23 also includes the subject matter according to any one of examples 21 or 22, above.

An apparatus includes a mapping module that maps image frames of the image data to the navigation data. The preceding subject matter of this paragraph characterizes example 24 of the present disclosure, wherein example 24 also includes the subject matter according to any one of examples 21, 22, or 23, above.

Each sampling time period corresponding to the navigation data is mapped to an image frame of the image data. The preceding subject matter of this paragraph characterizes example 25 of the present disclosure, wherein example 25 also includes the subject matter according to any one of examples 21, 22, 23, or 24, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
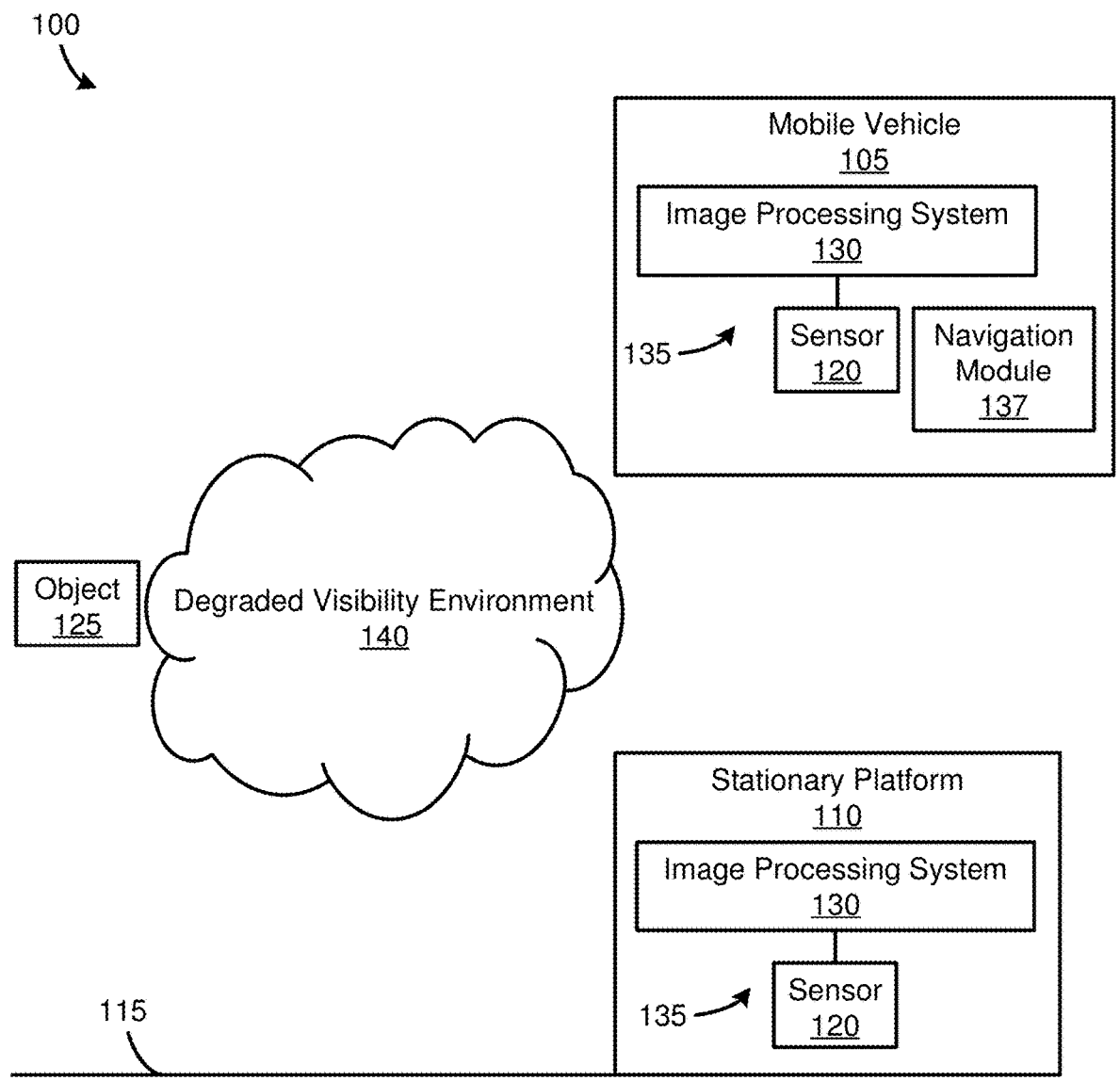
FIG. 1 is a schematic diagram of an environment in which image data may be received and/or processed according to one or more examples of the present disclosure.

Referring to FIG. 1, and according to one embodiment, an environment 100 in which image data may be received and/or processed is illustrated. As used herein, image data may refer to one or more images, image video data, video data, a sequence of images, and/or image sequence data. In the illustrated environment 100, a mobile vehicle 105 and/or a stationary platform 110 may be used to receive and/or process image data. In certain embodiments, the mobile vehicle 105 may be an aircraft such as an airplane, a helicopter, a jet, a drone, and so forth flyable above a ground surface 115. In other embodiments, the mobile vehicle 105 may be a rocket, a satellite, a missile, and so forth. Moreover, in some embodiments, the stationary platform 110 may be part of a ground surveillance system positioned on the ground surface 115.

Both the mobile vehicle 105 and the stationary platform 110 may include a sensor 120 used to detect or capture optical images of objects, such as an object 125, and to convert the optical images of objects into image data associated with the images. As may be appreciated, the sensor 120 may be any suitable image sensor, such as an infrared (IR) sensor, a semiconductor charge-coupled device (CCD), an active pixel sensor, and so forth. The image data associated with the images may be produced and/or provided to another device. For example, in the illustrated embodiment, the sensor 120 may provide the image data to an image processing system 130 to process the image data and/or to enhance the quality of the image data. As illustrated, an imaging system 135 includes the sensor 120 and the image processing system 130. The mobile vehicle 105 includes a navigation module 137 having a navigation unit that produces navigation data (e.g., position, orientation, pitch, roll, yaw, etc.) that may be used by the imaging system 135.

As illustrated, a degraded visibility environment 140 may block (e.g., temporarily, momentarily, for a period of time) the sensor 120 from sensing a clear image of the object 125, thus resulting in degraded image data. The degraded visibility environment 140 may be any type of environment that reduces the quality of the sensed image obtained from the sensor 120. For example, the degraded visibility environment 140 may include fog, haze, sand-brownout, smoke, rain, snow, steam, and so forth. The image processing system 130 may be used to predict a position of the object 125 while the degraded visibility environment 140 is present. The object 125 may be located within or adjacent to the degraded visibility environment 140. Similarly, the mobile vehicle 105 and stationary platform 110 also may be located within or adjacent to the degraded visibility environment 140.

The image processing system 130 may be used to display the object 125 even when the degraded visibility environment 140 blocks the object 125. To display the object 125, the image processing system 130 may detect a first location of the object 125 on a first image frame of image data on which the object 125 is visible. The image processing system 130 may also determine a second location of the object 125 on a second image frame of the image data on which the object 125 is not detectable due to an obstruction. The image processing system 130 may display a representation of the object 125 on the second image frame. Accordingly, the image processing system 130 may display the object 125 even if image sequence data obtained by the sensor 120 is degraded.

Figure 2:
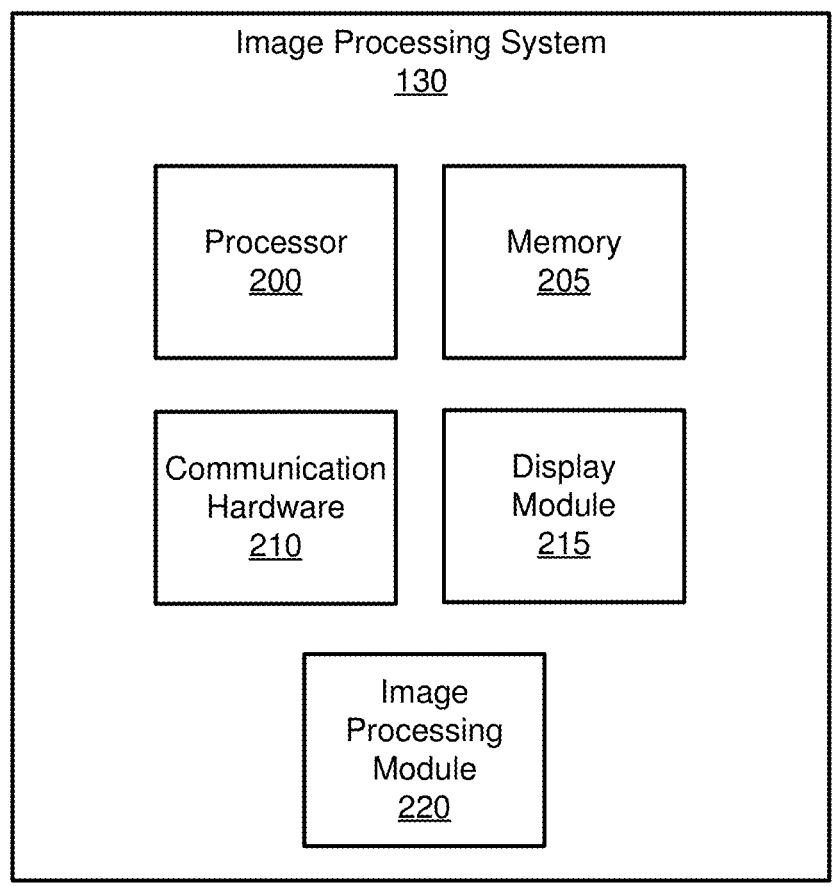
FIG. 2 is a schematic block diagram of an image processing system according to one or more examples of the present disclosure.

FIG. 2 is a schematic block diagram of an embodiment of the image processing system 130. The image processing system 130 includes a processor 200, memory 205, communication hardware 210, a display module 215, and an image processing module 220. The memory 205 may be a semiconductor storage device, a hard disk drive, an optical storage device, a micromechanical storage device, or combinations thereof. Furthermore, the memory 205 may store code and the processor 200 may be used to execute the code. In certain embodiments, the processor 200 may be operatively coupled to the sensor 120 and configured to receive image data from the sensor 120. Moreover, the communication hardware 210 may communicate with other devices. The display module 215 may be a display device operatively coupled to the processor 200 and used to display data, such as image data and/or enhanced image data. The image processing module 220 may include various modules used to enhance image data received from the sensor 120.

In certain embodiments, the memory 205 may store code executable by the processor to: detect a first location of an object on a first image frame of the image data; predict a second location of the object on a second image frame of the image data; display a representation of the object on the second image frame; synchronize frames of the image data with the navigation data; determine whether the object is stationary or moving; determine a first position of the mobile vehicle corresponding to the first image frame; determine a second position of the mobile vehicle corresponding to the second image frame; predict the second location of the object based on the first location of the object, the first position of the mobile vehicle, and the second position of the mobile vehicle; determine a first position of the object corresponding to the first image frame; determine another position of the object corresponding to the image frame before the first image frame; generate a motion model for the object based on the first location of the object and the another location of the object; and/or predict the second location of the object in the second image frame based on the motion model for the object, the first position of the object, and the sampling time of the second image frame.

Figure 3:
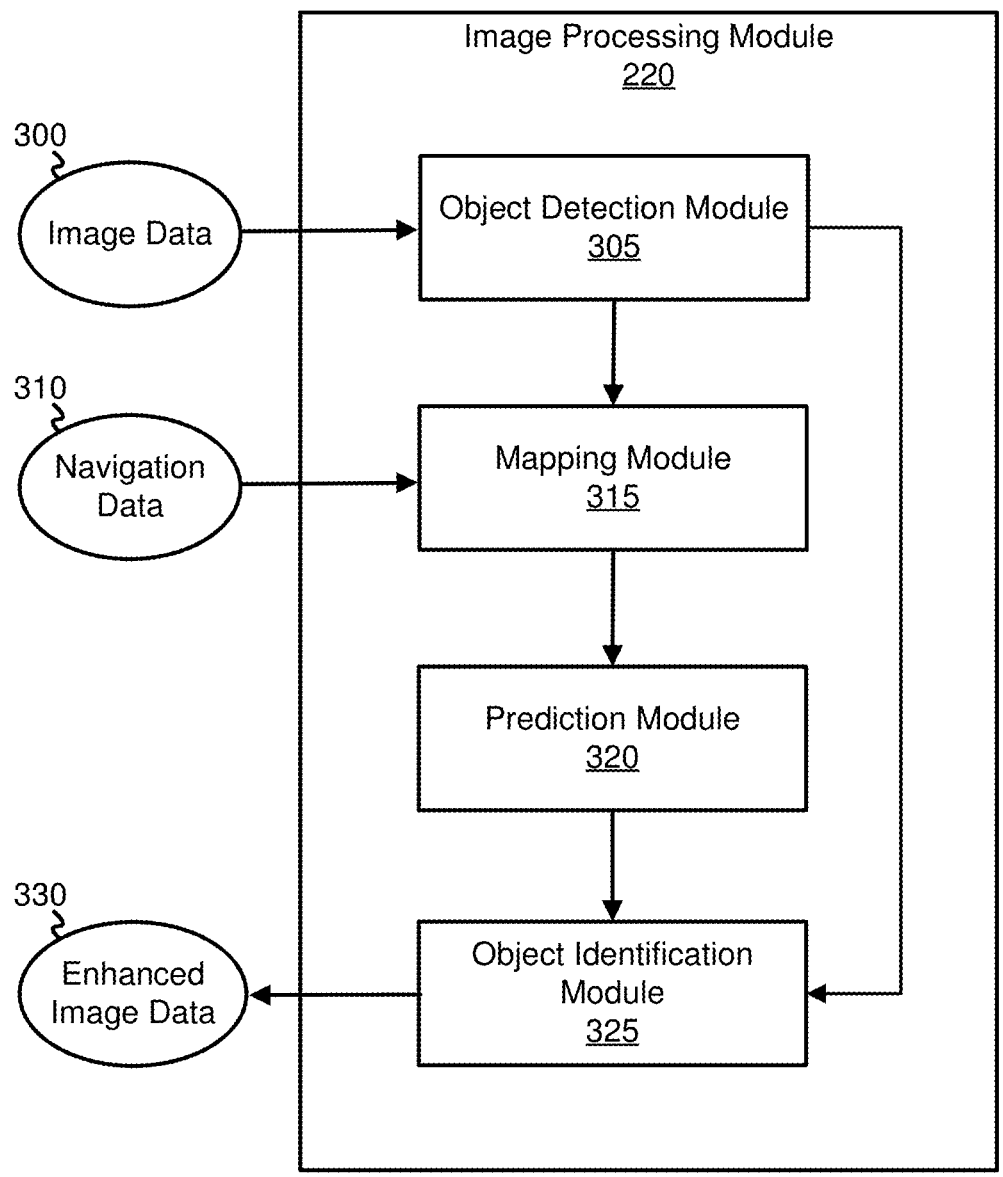
FIG. 3 is a schematic block diagram of an image processing module according to one or more examples of the present disclosure.

FIG. 3 is a schematic block diagram of one embodiment of the image processing module 220. The image processing module 220 receives image sequence data 300, such as image sequence data from a degraded environment. An object detection module 305 obtains the image sequence data 300, such as by using the sensor 120. The object detection module 305 may acquire multiple images that may be part of a video in an environment outside of a vehicle (e.g., mobile vehicle 105, stationary vehicle 110). Moreover, the object detection module 305 may detect a first location of an object 125 on a first image frame of image data based on intensity values corresponding to the first image frame. In various embodiments, the object detection module 305 may be used to detect and/or track an object 125 in a clear screen that is visible because the environment is not degraded to the point to obscure detection. The object detection module 305 may, for example, comprise a software module that, when executed by a processor, operates to detect an object in the first image frame based on intensity values in the first frame, as explained below.

In certain embodiments, when the landing ground 115 is in a clear condition, an object 125 may be detected and tracked from infrared image sequences. Because infrared images have no texture on objects, object detection in infrared images may be based on intensity values of the objects. Thresholding-intensity based detection and saliency based detection may be widely used in object detection from infrared images. In certain threshold based techniques: a threshold is predetermined; pixels with intensity values larger than the threshold are treated as object pixels; and objects are determined from the object pixels with some size constraint on the detected object. In saliency based object detection: some special filters may be applied to infrared images for computing saliency features; and then thresholding based techniques may be applied to the saliency features for extracting objects. In various embodiments, saliency based techniques may be more robust than intensity based value based thresholding techniques.

To track objects in infrared image sequences, prediction techniques may be used to track next positions of objects in image sequences. Kalman filtering and linear prediction models may be used for object tracking in infrared images. To apply Kalman filtering to object-tracking problem, an object tracking system may be modeled as a linear system by Equation 1.

$$\begin{cases} \dot{X} = AX + u \\ Y = CX + w \end{cases} \quad \text{Equation 1}$$

where $X=[r, v, a]^T$ is internal states; the variable r is object range; the variable v is object speed; the variable a is object acceleration; the variable Y is observation vector; the variables u and w are independent random noises. The state transition matrix A is given by Equation 2.

$$A = \begin{bmatrix} 1.0 & T & \frac{T^2}{2} \\ 0.0 & 1.0 & T \\ 0.0 & 0.0 & 1.0 \end{bmatrix} \quad \text{Equation 2}$$

The variable T is a sampling time step. The transition matrix may assume that objects have constant accelerations. The observation matrix C is given by Equation 3.

$$C = \begin{bmatrix} 1.0 & 0.0 & 0.0 \\ 0.0 & 1.0 & 0.0 \end{bmatrix} \quad \text{Equation 3}$$

In Kalman filtering, a procedure of predicting the states of time n using the observation at time n−1 may be given by the set of Equations 4-8.

$$\hat{X}_{n|n-1} = A\hat{X}_{n-1|n-1} \quad \text{Equation 4}$$

$$\hat{P}_{n|n-1} = A\hat{P}_{n-1|n-1}A^T + Q_u \quad \text{Equation 5}$$

$$K_n = P_{n|n-1}C^T[CP_{n|n-1}C^T + Q_w]^{-1} \quad \text{Equation 6}$$

$$\hat{X}_{n|n} = \hat{X}_{n|n-1} + K_n[Y_n - C\hat{X}_{n|n-1}] \quad \text{Equation 7}$$

$$P_{n|n} = [1 - K_nC]P_{n|n-1} \quad \text{Equation 8}$$

where $Q_u = E[uu^T]$ and $Q_w = E[ww^T]$ are covariance matrixes for the noise processes, u(t) and w(t), respectively. The symbols K(n) and P(n) are the Kalman gain vector and the state covariance matrix. The Kalman filtering may be initiated by Equations 9 and 10.

$$\hat{X}_{0|0} = E[X_0] \quad \text{Equation 9}$$

$$P_{0|0} = E[X_0X_0^T] \quad \text{Equation 10}$$

The prediction of a future observation may be written as found in Equation 11.

$$\hat{Y}_{n+1} = C\hat{X}_{n|n} \quad \text{Equation 11}$$

In a linear prediction model, objects may be assumed to move in constant speeds. As a result, future positions of objects (whose locations have been detected in the first image frame and a number of subsequent image frames) may be predicted by Equation 12.

$$\begin{cases} r_{n+1} = r_n + v_n T \\ v_{n+1} = v_n \end{cases} \quad \text{Equation 12}$$

where $r_{n+1}$ is the future value of an object range; $v_{n+1}$ is the future value of object speed; and T is a sampling interval of time. The object speed, $v(n)=[v_{row}(n), v_{col}(n)]^T$, may be estimated by object displacement as shown in Equations 13 and 14.

$$v_{row}(n) = \frac{i(n) - i(n-1)}{T} \quad \text{Equation 13}$$

$$v_{col}(n) = \frac{j(n) - j(n-1)}{T} \quad \text{Equation 14}$$

The vector $p(n)=[i(n), j(n)]^T$ is the position vector of an object on the image plane at time n.

Navigation data 310 from a navigation unit and image data (e.g., image frames, image frame data, object data) from the object detection module 305 are provided to a mapping module 315. The mapping module 315 maps (e.g., synchronizes) image frames of the image data to the navigation data. For example, in certain embodiments, each sampling time period corresponding to the navigation data 310 is mapped to an image frame of the image data for the associated time period.

In certain embodiments, infrared image frames and the navigation data 310 may have different data rates, which may mean that they may not be sampled at the same time interval. Accordingly, to use the navigation data 310 to process infrared image frames, the mapping module 315 may match the navigation data 310 to the infrared image frames in a time index (e.g., time stamps). In one embodiment, a time instant of navigation data 310 that is the closest to the time instant of an infrared image frame may be used as the matched time instant of the navigation data 310 for a respective infrared image frame. The mapping module 315 may use Equations 15 and 16 to synchronize the infrared image frames and the navigation data 310. For Equations 15 and 16, let $t_{nav}(n)$ be an indexed time for navigation data and $t_{IR}(n)$ be an indexed time for infrared image frames. For the $k^{th}$ infrared image frame, the navigation time index is computed as shown in Equations 15 and 16.

$$k* = \underset{i \in N_k}{\operatorname{argmin}} |t_{nav}(i) - t_{IR}(k)| \quad \text{Equation 15}$$

$$N_k = \{i \in I : |t_{nav}(i) - t_{IR}(k)| \leq \eta\} \quad \text{Equation 16}$$

The navigation at time $t_{nav}(k*)$ may be used as the matched navigation data 310 for the $k^{th}$ infrared image frame. The threshold $\eta$ may be set to one millisecond because navigation data 310 may have a higher sampling rate than infrared image frames generally.

A prediction module 320 determines a location of the object 125 on an image frame of the image data on which the object is not detectable due to an obstruction (e.g., degraded visibility environment 140). The prediction module 320 may determine the location of the object 125 for moving objects and/or for stationary objects, based on the detected location of the object 125 in preceding image frames that are not obscured as a result of a degraded visibility environment. An object identification module 325 uses object data from the object detection module 305 and predicted object locations from the prediction module 320 to identify predicted locations on images where objects are expected to be, when the objects in the image are obscured as a result of a degraded visibility environment. As a result of a degrade visibility environment, the objects are obscured in the images and their locations are not known, absent the present approach of identifying the predicted locations on the images where objects are expected or predicted to be. The object identification module 325 outputs enhanced image data 330 that may be displayed by the display module 215. For example, the display module 215 may display a representation of the object on the images (by projection onto or overlaying the representation of the object onto the image) in a predicted location where the predicted object is expected to be.

Figure 4:
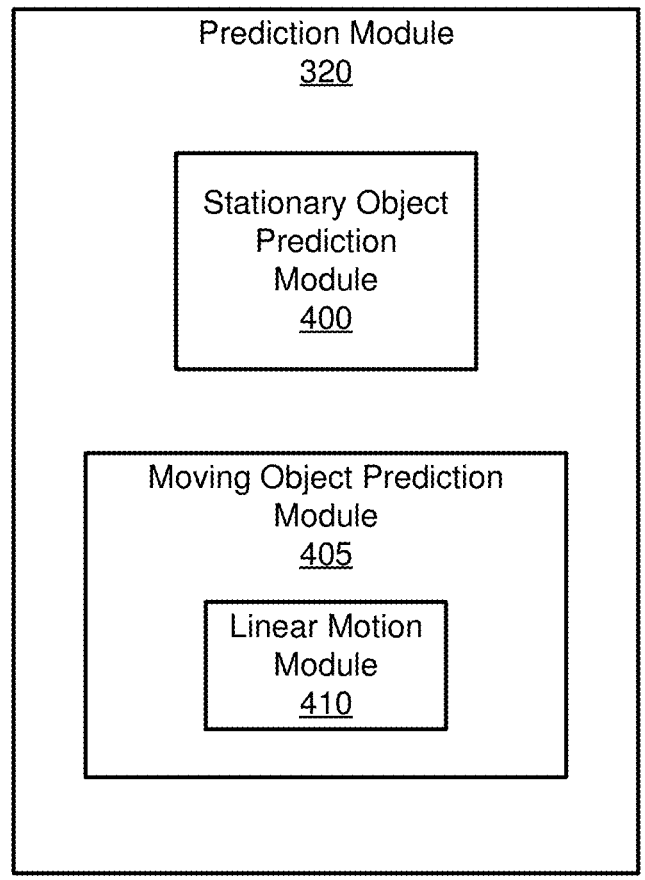
FIG. 4 is a schematic block diagram of a prediction module according to one or more examples of the present disclosure.

FIG. 4 is a schematic block diagram of one embodiment of the prediction module 320. The prediction module 320 includes a stationary object prediction module 400 used to predict object locations for stationary objects, and a moving object prediction module 405 used to predict object locations for moving objects.

In various embodiments, the moving object prediction module 405 determines position changes of moving objects on the ground using two types of motions (e.g., the object 125 movement and movement of the mobile vehicle 105). In a seeing phase (e.g., with a clear image frame), motion vectors of moving objects may be estimated. In some embodiments, it may be difficult to separate the two types of motion from the motion vectors. In other words, it may be difficult to separate the object 125 movement from the motion vectors corresponding to the mobile vehicle 105. In images having degraded visibility environment 140, the mobile vehicle 105 moving dynamics may be estimated from the navigation data 310, but the object 125 moving dynamics may be unknown; therefore, it may be difficult to obtain the combined movements for the moving objects. In certain embodiments, combined motion of the object 125 and of the mobile vehicle 105 may be assumed to be a smooth linear motion with a constant speed. In some embodiments, the combined motion is modeled by a linear motion module 410 or a Kalman filter model.

The linear motion module 410 may generate a linear motion model in response to the object 125 moving and provides information corresponding to the linear motion model to the prediction module 320 to facilitate determining a location of the object 125. The linear motion model may be estimated during a clear image (e.g., seeing phase) without degraded visibility. In an image that has degraded visibility (e.g., a remembering phase), the estimated model may be used for position prediction of moving objects 125. In some embodiments, for the linear motion model, the next position of an object 125 may be given by Equation 17.

$$P_{n+1} = P_n + v \times \Delta t \quad \text{Equation 17}$$

The speed v is estimated in the seeing phase; the variable $\Delta t$ is the time interval between the new position and the old position.

For a Kalman filter model, a Kalman gain factor, K(n), is treated as a constant estimated in the seeing phase. The next position (e.g., range) of an object may be estimated using Equations 4 through 11. For an estimated moving direction angle, $\theta$, the next position vector, $p(n)=[i(n),j(n)]^T$, is calculated using Equations 18 and 19.

$$i(n)=r(n)\sin(\theta) \quad \text{Equation 18}$$

$$j(n)=r(n)\cos(\theta) \quad \text{Equation 19}$$

Figure 5:
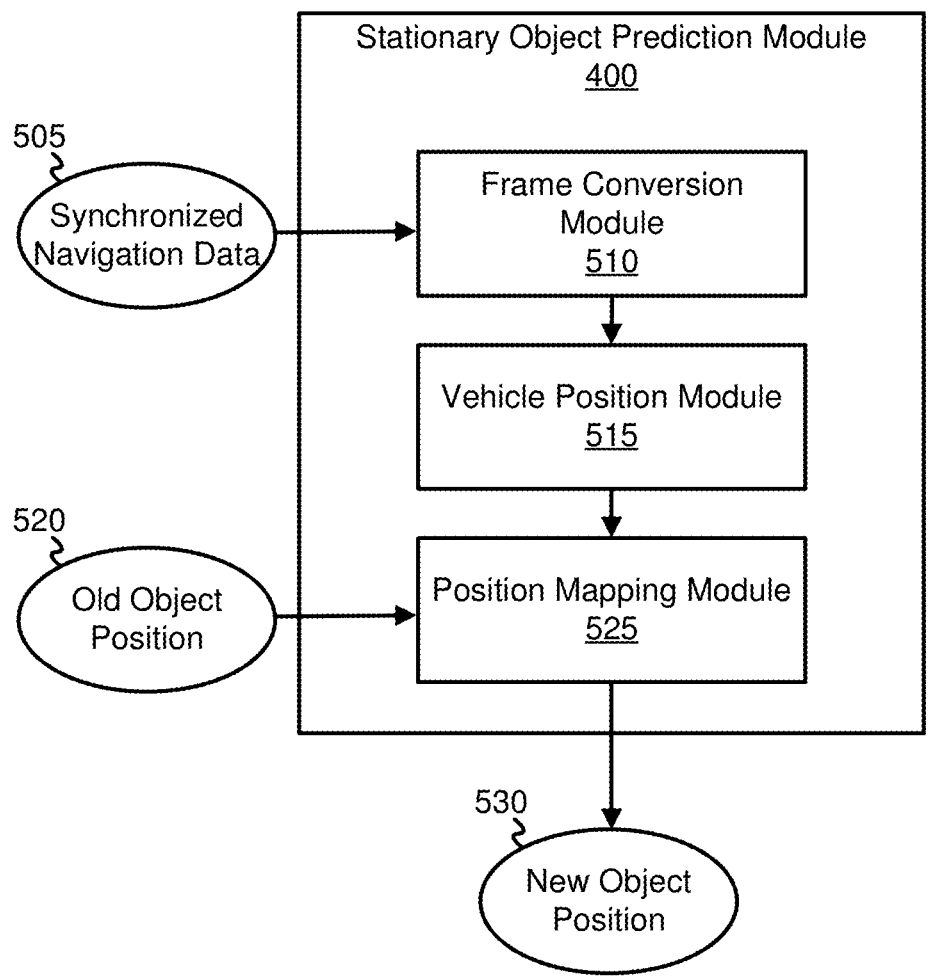
FIG. 5 is a schematic block diagram of a stationary object prediction module according to one or more examples of the present disclosure.

FIG. 5 is a schematic block diagram of one embodiment of the stationary object prediction module 400. The position changes of stationary objects on the image plane may be mainly determined by the movement of the mobile vehicle 105 because the locations of stationary objects on the ground are fixed, and only the viewing position changes due to the mobile vehicle 105 moving. The position changes of the mobile vehicle 105 may be calculated from navigation data. New positions of stationary objects on the image plane may be estimated by the movement of the mobile vehicle 105. FIG. 5 illustrates one embodiment of a procedure for the stationary object prediction module 400 to estimate new positions of stationary objects in degraded conditions.

Specifically, the stationary object prediction module 400 may receive synchronized navigation data 505. A frame conversion module 510 may convert the synchronized navigation data 505 from a navigation frame to a universal transverse mercator (UTM) system. A vehicle position module 515 uses the output from the frame conversion module 510 to estimate a position change of the mobile vehicle 105. A prior known object position 520 and output from the vehicle position module 515 are provided to a position mapping module 525 that maps the prior known object position 520 to a new object position 530.

In various embodiments, to track stationary objects on the ground may be substantially equivalent to mapping an object from one image plane to another image plane because the objects are stationary and only the viewing position (e.g., image plane) changes. In some embodiments, a transformation matrix between the two image planes may be used. For example, if p(n−1) is a prior known object position in a prior image plane, and p(n) is a new object position in the new image plane, then Equations 20 and 21 result.

$$p(n)=sTp(n-1) \quad \text{Equation 20}$$

$$T=[T_r,T_t] \quad \text{Equation 21}$$

The variable s is a scale factor depending on the depth difference of the two image planes to the objects on the ground. The matrix $T_r$ is a rotation matrix and $T_t$ is a translation vector. Both of these may be determined by movement of the mobile vehicle 105 and may be estimated from the navigation data. The navigation data may generally be based on the navigation frame (e.g., latitude, longitude). To calculate the translation vector of the mobile vehicle 105 movement, the navigation frame may need to be converted to a local coordinate system. As set forth above, the frame conversion module 510 converts the navigation frame into the UTM coordinate system. In some embodiments, the UTM system may use north-east-up (NEU) to represent a three-dimensional coordinate system. Mathematically, converting may be performed using a set of Equations 22 through 33. For these equations: φ represents latitude; and λ represents longitude. Moreover, the following constants are used. Equatorial radius: a=6378,137 km; inverse flattening: 1/f=298.257223563; $k_0$=0.9996; $N_0$=10000 km for southern hemisphere and 0 for northern hemisphere; and $E_0$=500 km. Intermediate variables may be calculated using the following equations:

$$n = \frac{f}{2-f}, \quad A = \frac{a}{1+n}\left(1 + \frac{n^2}{4} + \frac{n^4}{64}\right) \quad \text{Equation 22}$$

$$\alpha_1 = \frac{1n}{2} - \frac{2n^2}{3} + \frac{5n^3}{16}; \alpha_2 = \frac{13n^2}{48} - \frac{3n^3}{5}; \alpha_3 = \frac{61n^3}{240} \quad \text{Equation 23}$$

$$\beta_1 = \frac{1n}{2} - \frac{2n^2}{3} + \frac{37n^3}{96}; \beta_2 = \frac{n^2}{48} + \frac{n^3}{15}; \beta_3 = \frac{17n^3}{480} \quad \text{Equation 24}$$

$$\delta_1 = 2n - \frac{2n^2}{3} + 2n^3; \delta_2 = \frac{7n^2}{3} - \frac{8n^3}{5}; \delta_3 = \frac{56n^3}{15} \quad \text{Equation 25}$$

$$t = \sinh\left(\tanh^{-1}(\sin(\varphi)) - \frac{2\sqrt{n}}{1+n}\tanh^{-1}\left(\frac{2\sqrt{n}}{1+n}\sin(\varphi)\right)\right) \quad \text{Equation 26}$$

$$\xi = \tan^{-1}\left(\frac{t}{\cos(\lambda-\lambda_0)}\right); \eta = \tanh^{-1}\left(\frac{\sin(\lambda-\lambda_0)}{\sqrt{1+t^2}}\right) \quad \text{Equation 27}$$

Then the UTM coordinates may be calculated by Equations 28 and 29.

$$E = E_0 + k_0 A\left(\eta + \sum_{j=1}^{3}\alpha_j\cos(2j\xi)\sinh(2j\eta)\right) \quad \text{Equation 28}$$

$$N = N_0 + k_0 A\left(\xi + \sum_{j=1}^{3}\alpha_j\sin(2j\xi)\cosh(2j\eta)\right) \quad \text{Equation 29}$$

With the UTM coordinate system, the translation vector may be calculated by Equations 30 through 33.

$$T_t = f[\Delta\text{Alt}, \Delta E, \Delta N]^T \quad \text{Equation 30}$$

$$\Delta\text{Alt} = \text{Alt}(n) - \text{Alt}(n-1) \quad \text{Equation 31}$$

$$\Delta E = E(n) - E(n-1) \quad \text{Equation 32}$$

$$\Delta N = N(n) - N(n-1) \quad \text{Equation 33}$$

The variable f is infrared camera focus length; and the variables Alt, E, and N, represent altitude, east, and north respectively. Because object position on an image plane is represented by homogeneous coordinates, the object position mapping from one plane to another one may be accurate up to a scale because of the different depths from two image planes to objects on the ground. In various embodiments, UTM coordinate values of the north axis are used to estimate a scale factor. For example, for a given navigation position, $p(n)=[\text{Alt}(n), E(n), N(n)]^T$, the scale factor may be calculated by Equation 34.

$$s = \frac{N(n-1)}{N(n)} \quad \text{Equation 34}$$

In some embodiments, rotation matrix may be estimated by a Euler angles approach given by Equations 35 through 38.

$$T_r = C_{Alt}(\Delta\phi)C_E(\Delta\theta)C_N(\Delta\psi) \quad \text{Equation 35}$$

$$C_{Alt}(\Delta\phi) = \begin{bmatrix} 1 & 0 & 0 \\ 0 & \cos(\Delta\phi) & \sin(\Delta\phi) \\ 0 & -\sin(\Delta\phi) & \cos(\Delta\phi) \end{bmatrix} \quad \text{Equation 36}$$

$$C_E(\Delta\theta) = \begin{bmatrix} \cos(\Delta\theta) & 0 & -\sin(\Delta\theta) \\ 0 & 1 & 0 \\ \sin(\Delta\theta) & 0 & \cos(\Delta\theta) \end{bmatrix} \quad \text{Equation 37}$$

$$C_N(\Delta\psi) = \begin{bmatrix} \cos(\Delta\psi) & \sin(\Delta\psi) & 0 \\ -\sin(\Delta\psi) & \cos(\Delta\psi) & 0 \\ 0 & 0 & 1 \end{bmatrix} \quad \text{Equation 38}$$

The variables $\Delta\phi$, $\Delta\theta$, and $\Delta\psi$, are angle differences in yaw, pitch, and roll from one mobile vehicle 105 position to another position. Depending on position changes of the mobile vehicle 105, a translation matrix and a rotation matrix may (individually or in combination) be included in a transformation matrix for mapping a location of an object from one image plane to another image plane. Where a location of an object is obscured in a latter image frame as a result of a degrade visibility environment, a representation of the object may be displayed (for example, overlaid on the image) in a predicted location of where the object is expected to be, using the transformation matrix for mapping a location of a visible object from one image plane to another image plane. The object detection module 305, mapping module 310, prediction module 320, object identification module 325, stationary object prediction module 400, and frame conversion module 510 may comprise software modules that, when executed by a processor, operate to perform algorithms including the equations and steps described above. Where the mobile vehicle 105 is an aircraft that is airborne above a ground surface 115, and an object such as a landing pad or landing ground 115 that is detected in a first image frame (obtained from a sensor on the vehicle) is obscured in a second image frame as a result of a degraded visibility environment, the display module 215 is configured to display on a display device associated with the vehicle a representation of the object on the second image frame in a predicted location where the object is expected to be. The representation of the object on the second image frame may be displayed by projecting or overlaying the representation of the object onto the second image frame in a predicted location where the object is expected to be, such that the representation of the object is displayed on a display device of the mobile vehicle to an operator of the vehicle. Accordingly, an operator of the mobile vehicle 105 may therefore better control operation of the vehicle during periods in which images are obscured as a result of a degraded visibility environment, by virtue of the display device displaying the representation of the object that is overlaid on the image in a predicted location where the object is expected to be.

Figure 6:
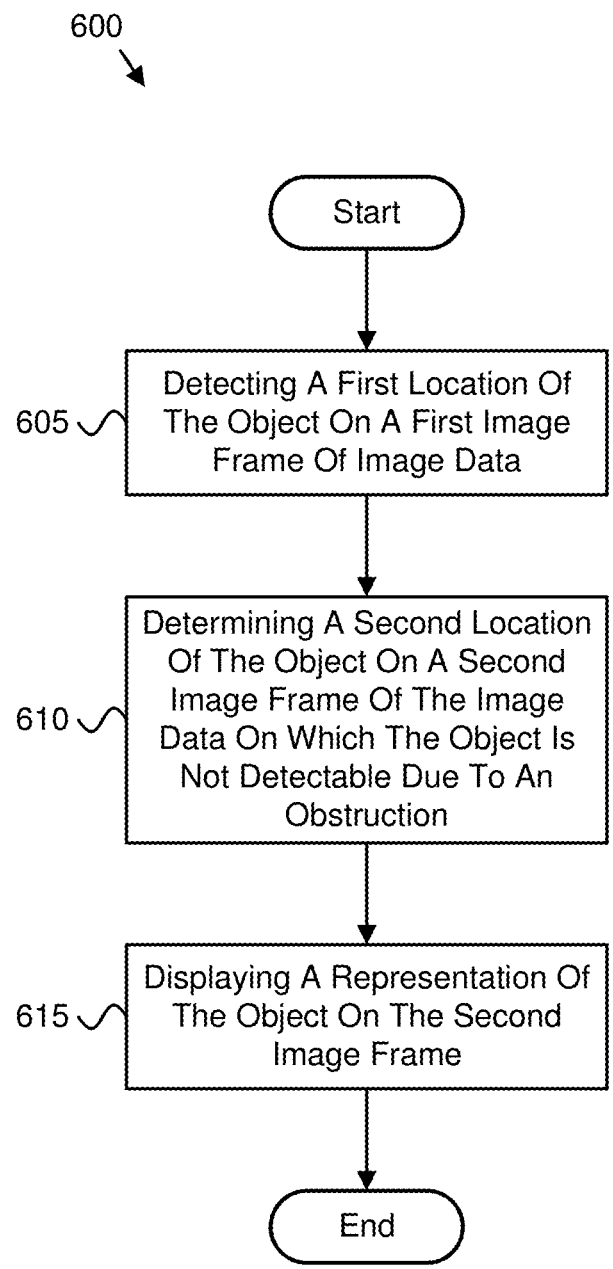
FIG. 6 is a schematic flow diagram of a method for displaying an object according to one or more examples of the present disclosure.

FIG. 6 is a schematic flow diagram of one embodiment of a method 600 for displaying an object (e.g., the object 125). The method 600 may include detecting 605 a first location of the object on a first image frame of image data. In certain embodiments, the image data may be infrared data captured by an infrared sensor. In various embodiments, the first location of the object is detected based on intensity values corresponding to the infrared image data. In some embodiments, the image data includes multiple images in a video of an environment outside of a vehicle that are acquired in real time using infrared imaging equipment of the vehicle.

Furthermore, the method 600 may include determining 610 a second location of the object on a second image frame of the image data on which the object is not detectable due to an obstruction (e.g., degraded visibility environment 140).

Moreover, the method 600 may include displaying 615 a representation of the object on the second image frame.

In certain embodiments, the method 600 may include determining whether the object is stationary or moving. In some embodiments, the method 600 includes, in response to the object determined to be stationary, determining the second location of the object on the second image frame based on the first location of the object and a change in position of a vehicle used to capture the image data. In various embodiments, the method 600 includes, in response to the object determined to be moving, determining the second location of the object on the second image frame based on the first location of the object, a predicted location of the object, and a change in position of a vehicle used to capture the image data. In various embodiments, the method 600 includes synchronizing the image data with navigation data of a vehicle.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the image processing module 220 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The image processing module 220 may be implemented as a hardware circuit comprising custom VLSI circuits or gate arrays, off-the-shelf semiconductors such as logic chips, transistors, or other discrete components. The image processing module 220 may also be implemented in programmable hardware devices such as field programmable gate arrays, programmable array logic, programmable logic devices or the like.

The image processing module 220 may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the image processing module 220. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of displaying an object identified from image data captured from a mobile vehicle, comprising:
    detecting a first location of the object on a first image frame of image data;
    determining a second location of the object on a second image frame of the image data, wherein the object is not detectable on the second image frame due to an obstruction; and
    displaying a representation of the object on the second image frame in the second location, wherein the second location corresponds with a predicted location of where the object is expected to be in the second image frame.

2. The method of claim 1, wherein the image data comprises infrared image data.

3. The method of claim 2, wherein the first location of the object is detected based on intensity values corresponding to the infrared image data.

4. The method of claim 1, further comprising determining whether the object is stationary or moving.

5. The method of claim 4, further comprising, in response to the object determined to be stationary, determining the second location of the object on the second image frame based on the first location of the object and a change in position of a vehicle used to capture the image data.

6. The method of claim 4, further comprising, in response to the object determined to be moving, determining the second location of the object on the second image frame based on the first location of the object, a predicted location of the object, and a change in position of a vehicle used to capture the image data.

7. The method of claim 1, further comprising synchronizing the image data with navigation data of a vehicle.

8. The method of claim 1, wherein detecting a first location of the object comprises detecting a first location of an object comprising a landing area on a first image frame of image data.

9. The method of claim 8, further comprising determining whether the object is stationary or moving, and in response to a determination that the object is stationary, determining the second location of the object on the second image frame in which the object is not detectable due to an obstruction, based on the first location of the object and a change in position of the mobile vehicle.

10. The method of claim 9, wherein displaying the representation of the object on the second image frame comprises displaying, on a display device associated with the mobile vehicle, a representation of the object comprising a landing area that is overlaid on the second image frame where the object is expected to be, such that the object that is not detectable on the second image frame is displayed as a representation of the object to an operator of the mobile vehicle.

11. A mobile vehicle, comprising:
a sensor configured to detect an image and to produce image data associated with the image;
a processor operatively coupled to the sensor and configured to receive the image data; and
a memory that stores code executable by the processor to:
detect a first location of an object on a first image frame of the image data;
predict a second location of the object on a second image frame of the image data, wherein the object is not detectable on the second image frame due to an obstruction; and
display a representation of the object on the second image frame in the second location, wherein the second location corresponds with a predicted location of where the object is expected to be in the second image frame.

12. The mobile vehicle of claim 11, wherein the sensor comprises an infrared image sensor.

13. The mobile vehicle of claim 11, further comprising a display device operatively coupled to the processor and configured to display the representation of the object on the second image frame.

14. The mobile vehicle of claim 11, further comprising a navigation unit that produces navigation data for the mobile vehicle.

15. The mobile vehicle of claim 14, wherein the code is executable by the processor to synchronize frames of the image data with the navigation data.

16. The mobile vehicle of claim 11, wherein the code is executable by the processor to determine whether the object is stationary or moving.

17. The mobile vehicle of claim 16, wherein the code is executable by the processor to, in response to the object determined to be stationary:
determine a first position of the mobile vehicle corresponding to the first image frame;
determine a second position of the mobile vehicle corresponding to the second image frame; and
predict the second location of the object based on the first location of the object, the first position, and the second position.

18. The mobile vehicle of claim 16, wherein the code is executable by the processor to, in response to the object determined to be moving:
determine a first position of the mobile vehicle corresponding to the first image frame;
determine a second position of the mobile vehicle corresponding to the second image frame;
generate a motion model for the object based on the first location of the object and another location of the object detected before the first image frame; and
predict the second location of the object based on the motion model for the object, the first position of the object.

19. The mobile vehicle of claim 11, wherein the memory that stores code includes an object detection module executable by the processor to detect a first location of the object comprising a landing area on a first image frame of image data, and a prediction module executable by the processor to predict a second location of the object on a second image frame in which the object is not detectable due to an obstruction, based on the first location of the object and a change in position of the mobile vehicle.

20. The mobile vehicle of claim 16, further comprising a display device associated with the mobile vehicle, for displaying the representation of the object on the second image frame that is overlaid on the second image frame where the object is expected to be, such that the object comprising a landing area that is obscured in the second image frame is displayed as a representation of the object to an operator of the mobile vehicle.

21. An apparatus, comprising:
an object detection module that detects a first location of an object on a first image frame of image data based on intensity values corresponding to the first image frame;
a prediction module that determines a second location of the object on a second image frame of the image data on which the object is not detectable on the second image frame due to an obstruction; and
a display module that displays a representation of the object on the second image frame in the second location, wherein the second location corresponds with a predicted location of where the object is expected to be in the second image frame;
wherein at least one of the object detection module, the prediction module, and the display module comprises one or more of hardware and executable code, the executable code stored on one or more non-transitory computer readable storage media.

22. The apparatus of claim 21, further comprising a linear motion module that generates a linear motion model in response to the object moving and provides information corresponding to the linear motion model to the prediction module to facilitate determining the second location of the object.

23. The apparatus of claim 21, further comprising a navigation module that generates navigation data for a vehicle used to capture the image data.

24. The apparatus of claim 21, further comprising a mapping module that maps image frames of the image data to the navigation data.

25. The apparatus of claim 24, wherein each time period corresponding to the navigation data is mapped to an image frame of the image data.

* * * * *